(No Model.)
O. STODDARD.
COMBINED HAND SEED PLANTER AND FERTILIZER DISTRIBUTER.
No. 256,069. Patented Apr. 4, 1882.
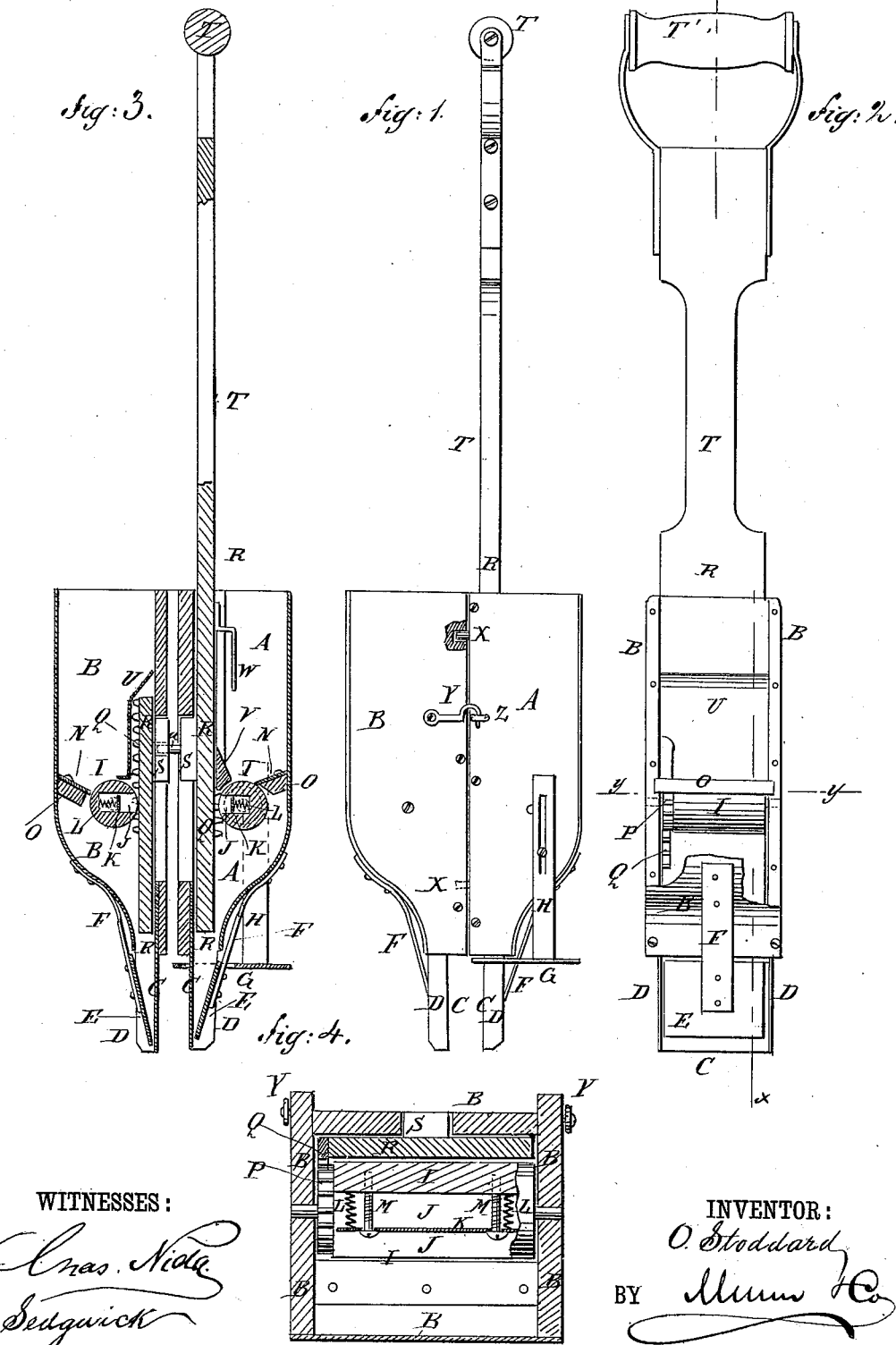

UNITED STATES PATENT OFFICE.

OWEN STODDARD, OF BUSTI, NEW YORK.

COMBINED HAND SEED-PLANTER AND FERTILIZER-DISTRIBUTER.

SPECIFICATION forming part of Letters Patent No. 256,069, dated April 4, 1882.

Application filed October 5, 1881. (No model.)

*To all whom it may concern:*

Be it known that I, OWEN STODDARD, of Busti, in the county of Chautauqua and State of New York, have invented certain new and useful Improvements in Combined Hand Seed-Planters and Fertilizer-Distributers, of which the following is a specification.

Reference is to be had to the accompanying drawings, forming part of this specification, in which similar letters of reference indicate corresponding parts in all the figures.

Figure 1 is a side elevation of my improvement. Fig. 2 is a rear elevation of the same, part being broken away. Fig. 3 is a sectional side elevation of the same, taken through the line $x\ x$ of Fig. 2. Fig. 4 is a horizontal section of a part of the same, taken through the line $y\ y$ of Fig. 2.

The object of this invention is to produce combined hand seed-planters and fertilizer-distributers simpler in construction, cheaper, lighter, and more durable than those heretofore made.

The invention consists in a novel construction and arrangement of parts, as hereinafter fully described.

A B represent two boxes, one of which is designed to receive seed and the other a fine fertilizer. The inner and side walls of the boxes A B are vertical, and their outer walls are inclined or curved inward and downward until the lower ends of the said sides nearly meet the inner walls or the plates C, attached to the lower parts of the said inner walls, and which project downward to enter the soil.

The side edges of the plates C are bent outward at right angles to form flanges D to serve as guards and guides to the plates E, the lower edges of which rest against the lower parts of the outer sides of the plates C, and the upper parts of which, or spring straps or plates F, attached to the said upper parts, are secured by bolts or rivets to the lower parts of the outer walls of the boxes A B. The plates C E thus meet each other at an angle, as shown in Fig. 3, so that they will enter the soil readily.

The depth to which the plates C E enter the soil is regulated by a gage-plate, G, which has an opening formed through it to receive the plates C E and allow the plate E to have the necessary play. To the side parts of the gage-plate G are attached, or upon it are formed, straps H, which pass up along the side walls of the box A, and are slotted longitudinally to receive the screws or bolts that fasten the said straps to the said box, so that the said gage-plate can be readily raised and lowered.

To the side walls of each box A B is pivoted a cylinder, I, in one side of which is formed a deep longitudinal groove, J, into which is fitted a plate, K. The plates K are held outward by spiral or other suitable springs, L, placed between them and the bottoms of the grooves J, and are held in place by screws M passing through them and screwing into the said cylinders I at the bottoms of the grooves J. With this construction the position of the plates K, and consequently the amount of seed and fertilizer discharged each time, can be regulated by turning the screws M in or out.

The cylinders I are kept from carrying out any more seed or fertilizer than enough to fill the grooves J by rubber plates N, attached to bars O, secured to the outer part of the boxes A B in such positions that the edges of the said rubber plates N will bear against the sides of the said cylinders I, as shown in Fig. 3.

To one end of each cylinder I is attached a gear-wheel, P, the teeth of which mesh into the teeth of the rack-bars Q, attached to the slides R, which move up and down along the inner surfaces of the inner walls of the boxes A B. With this construction, as the slides R move downward their lower ends strike against and press back the plates E, opening channels in the soil to receive the seed and fertilizer, and allowing the seed and fertilizer resting between the plates C E to drop into the said channel.

The downward movement of the slides R also turns the cylinders I to bring the grooves J above the cut-off N O to become filled with seed and fertilizer. As the slides R move upward the plates E move inward to receive and detain the seed and fertilizer, and the cylinders I are turned to discharge the contents of the grooves J into the lower parts of the boxes A B, ready to be discharged into the soil at the next downward movement of the slides R.

The movement of the slides R is limited by blocks S, attached to them, and which work in slots in the inner walls of the boxes A B, as shown in Fig. 3. One of the slides R is extended upward to serve as a handle, T, or has a handle, T', attached to it. The upper part of the other or short slide R is covered with a sheet-metal plate, U, or other cap, which forms a pocket, into which the said slide rises in its upward movement. The lower edge of the cap-plate U rests upon the cylinder I, and serves as a guard to prevent any fertilizer or seed from getting in between the said cylinder and said slide R. The seed or fertilizer in the other box, A, is kept from getting between the other cylinder I and slide R by a guide-block, V, attached to the said box A.

To the upper part of the seed-box slide R is attached a bar, W, which projects downward into the seed-box, and has its lower end forked or otherwise formed to adapt it to keep the seed stirred and prevent clogging.

The two boxes A B are placed with their inner walls against each other, and are connected detachably by dowel-pins X and hooks and staples Y Z, or by other suitable means. The slides R are connected by a dowel-pin, a, attached to one of the stop-blocks S and entering a hole in the other stop-block, so that the two slides R will always move together, and can be operated by a single handle. With this construction the two boxes A B can be readily connected and disconnected, so that they can be used singly or together, as may be required. When the box B is to be used separately the slide R must be replaced with a slide having a handle, or must have a handle attached to it.

Having thus fully described my invention, I claim as new and desire to secure by Letters Patent—

In a combined hand seed-planter and fertilizer-distributer, the combination, with the boxes A B, having slotted inner walls, and provided with the flanged plates C and the spring-plates E E, of the dropping-cylinders I, the gear-wheels P, and the slides R, provided with the racks Q, and the sliding blocks S, connected by the dowel-pin a, substantially as and for the purpose set forth.

OWEN STODDARD.

Witnesses:
  W. B. MARTIN,
  J. R. ROBERTSON.